US006568411B1

United States Patent
Staples et al.

(10) Patent No.: US 6,568,411 B1
(45) Date of Patent: May 27, 2003

(54) VEHICLE WASH RAMP

(75) Inventors: Roger Staples, Sacramento, CA (US); William D Peterson, Granite Bay, CA (US)

(73) Assignee: Peterson & Staples LLC, Sacramento, CA (US)

( * ) Notice: Subject to any disclaimer, the term of this patent is extended or adjusted under 35 U.S.C. 154(b) by 145 days.

(21) Appl. No.: 09/680,597

(22) Filed: Oct. 6, 2000

(51) Int. Cl.[7] ................................................. B60S 3/04
(52) U.S. Cl. ........................................................ 134/123
(58) Field of Search ................ 134/123, 45; 15/DIG. 2, 15/53.1, 53.4

(56) References Cited

U.S. PATENT DOCUMENTS

| | | | | |
|---|---|---|---|---|
| 3,229,703 A | * | 1/1966 | Thompson et al. | 134/123 X |
| 3,444,867 A | * | 5/1969 | Thornton | 134/123 |
| 3,510,352 A | * | 5/1970 | Neuman | 134/45 |
| 4,979,536 A | * | 12/1990 | Midkiff | 134/123 |

FOREIGN PATENT DOCUMENTS

| | | | | |
|---|---|---|---|---|
| CH | 480209 | * | 12/1969 | 15/DIG. 2 |
| DE | 2828334 | * | 1/1980 | 134/123 |
| GB | 2147859 | * | 5/1985 | 15/53.4 |

* cited by examiner

Primary Examiner—Philip R. Coe
(74) Attorney, Agent, or Firm—Heisler & Associates

(57) ABSTRACT

A vehicle wash ramp is provided which is constructed from a lattice framework of support rails and cross members that are connected to form a base and a wash platform above the base. The base and wash platform are equipped with a pair of parallel running wheel tracks which roughly correspond in their width and relative position to accommodate the passage of vehicles to be washed. Additionally, access to the wash platform is facilitated by the use of fixed and folding platform ramps which angle up to the upper surface of the wash platform. The washing operation is accomplished by the use of an engine and pump combination that draws water from one or both of two storage tanks located on either side of the wash ramp base outside of each of the wheel tracks. The pump assembly pressurizes the water and sends it to the spray wand which allows the operator not only to control the flow of water or cleaning solution, but also allows the operator to direct this flow to specific areas and components of the vehicle. Once cleaned, the vehicle can be driven off of the wash ramp and onto a paved surface without tracking dirt and debris onto the paved surface.

3 Claims, 5 Drawing Sheets

US 6,568,411 B1

VEHICLE WASH RAMP

FIELD OF THE INVENTION

The present invention relates to an improvement in the methods used to clean vehicles as they move from often muddy unpaved surfaces such as construction sites and farm fields to hard paved surfaces such as roads and highways. More particularly, this invention relates to a ramp-like apparatus that can be positioned on the border between a paved and unpaved surface. Once so positioned, vehicles passing from the dirt to the pavement can pass over the ramp where their tires and undercarriages can be washed clean of mud and other debris with cleaning fluid stored on the wash ramp.

BACKGROUND OF THE INVENTION

Off road vehicles, such as construction and farm vehicles often must pass over paved roads when in use. The tires of such vehicles carry dirt, mud and other debris onto the road. The prior art is limited in ways to practically clean the mud and debris off of construction and farm vehicles as they move from the often muddy construction sites and fields to hard paved roads and highways.

This situation is exacerbated in bad weather as rain and snow can turn a dry work site into a wet and muddy work site. These types of conditions create a dangerous and damaging situation as the tires and undercarriages of trucks and other similar equipment leave large areas of mud and other debris on the surface of the road or highway as they leave the work site. The mud deposits create very slippery areas on the highway or road that act as difficult to see unmarked hazards.

Additionally, such mud and debris must be cleaned up or will wash into drainage systems not designed for large volumes of mud and debris, potentially clogging or otherwise damaging such drainage systems. Many regions have regulations making the tracking of dirt onto roads illegal. However, compliance with these regulations is often difficult due to a lack of equipment to facilitate the required clean up From the forgoing discussion it can be seen that it would be advantageous to provide a method of cleaning the tires and undercarriage of construction and farm vehicles which allows for such maintenance as these vehicles leave the work site and enter public roads and highways. Additionally it would be advantageous to provide such a method of cleaning these vehicles that would allow the mechanism that facilitates this cleaning to be easily transported from one work site to another by commonly used transport vehicles.

SUMMARY OF THE INVENTION

It is the primary objective of the present invention to provide a method by which the tires and undercarriages of construction and farm vehicles can be cleaned of the mud and other debris that they pick up while performing their duties in unpaved work sites.

It is an additional objective of the present invention to provide such a method of cleaning the tires and undercarriages which includes a ramp-like apparatus over which the vehicle will be driven while passing from the unpaved work site to the paved road or highway.

It is a further objective of the present invention to provide such a ramp-like apparatus for the cleaning of these vehicles which is equipped with a high pressure pump and wand washing component and a storage tank or tanks which are employed to supply water and other cleaning solutions for use by the pump and wand.

It is a still further objective of the present invention to provide such an apparatus for the cleaning of these vehicles which is constructed in a manner in relation to its size and weight that will allows for its easy transportation from one work site to another.

These objectives are accomplished in a preferred embodiment of this invention by the use of a ramp-like apparatus that is constructed from a lattice framework of support rails and cross members which are connected to form a base and a wash platform above the base. This lattice method of construction for the bulk of the present invention is important as it allows most of the mud and debris being washed from the vehicle to fall to the ground below. Additionally, this method of construction provides the base and wash stand with a great deal of strength while also being relatively light weight which enhances the invention's portability characteristics.

The base and wash platforms are also equipped with a pair of parallel running wheel tracks which roughly correspond in their width and relative position to accommodate the passage of the great majority of these types of vehicles. The outside edge of each wheel track is also equipped with an outer wheel rail which extends up above the surface of the wheel tracks and functions to help keep the wheels, and therefore, the vehicle, in the proper location on the wash platform. Additionally, access to the wash platform is facilitated by the use of the fixed and folding platform ramps which angle up from the surface of the pavement and work site to the level of the upper surface of the wash platform. This design enables a vehicle to easily drive up onto the wash platform for cleaning when exiting a muddy work site or field.

The washing operation is accomplished by the use of an engine and pump combination that draws water and/or a cleaning solvent from one or both of the two storage tanks located on either side of the wash ramp base outside of each of the wheel tracks. The pump pressurizes the fluids drawn from the tanks and sends it to the spray wand through the high pressure hose. The spray wand is the component of the invention which allows the operator not only to control the flow of water or cleaning solution, but also allows the operator to direct this flow to specific areas and components of the vehicle.

Therefore, the present invention is employed to clean the tires and undercarriage of a vehicle leaving a muddy work site by driving the vehicle up onto the wash platform that straddles the border between the unpaved work site and the pavement of the road or highway. Once the vehicle is properly positioned on the wash platform, the driver or other person engages the pump motor which actuates the pump and supplies high pressure water or cleaning solution to the spray wand. The operator then uses the spray wand to direct a high pressure stream of water onto the vehicle which washes the mud off of the tires and undercarriage which then falls through the lattice construction of the base and onto the ground of the work site. The vehicle is then free to enter the paved surface of the road or highway without the danger of depositing mud thereon.

For a better understanding of the present invention reference should be made to the drawings and the description in which there are illustrated and described preferred embodiments of the present invention.

DESCRIPTION OF THE PREFERRED EMBODIMENT

Figure 1:
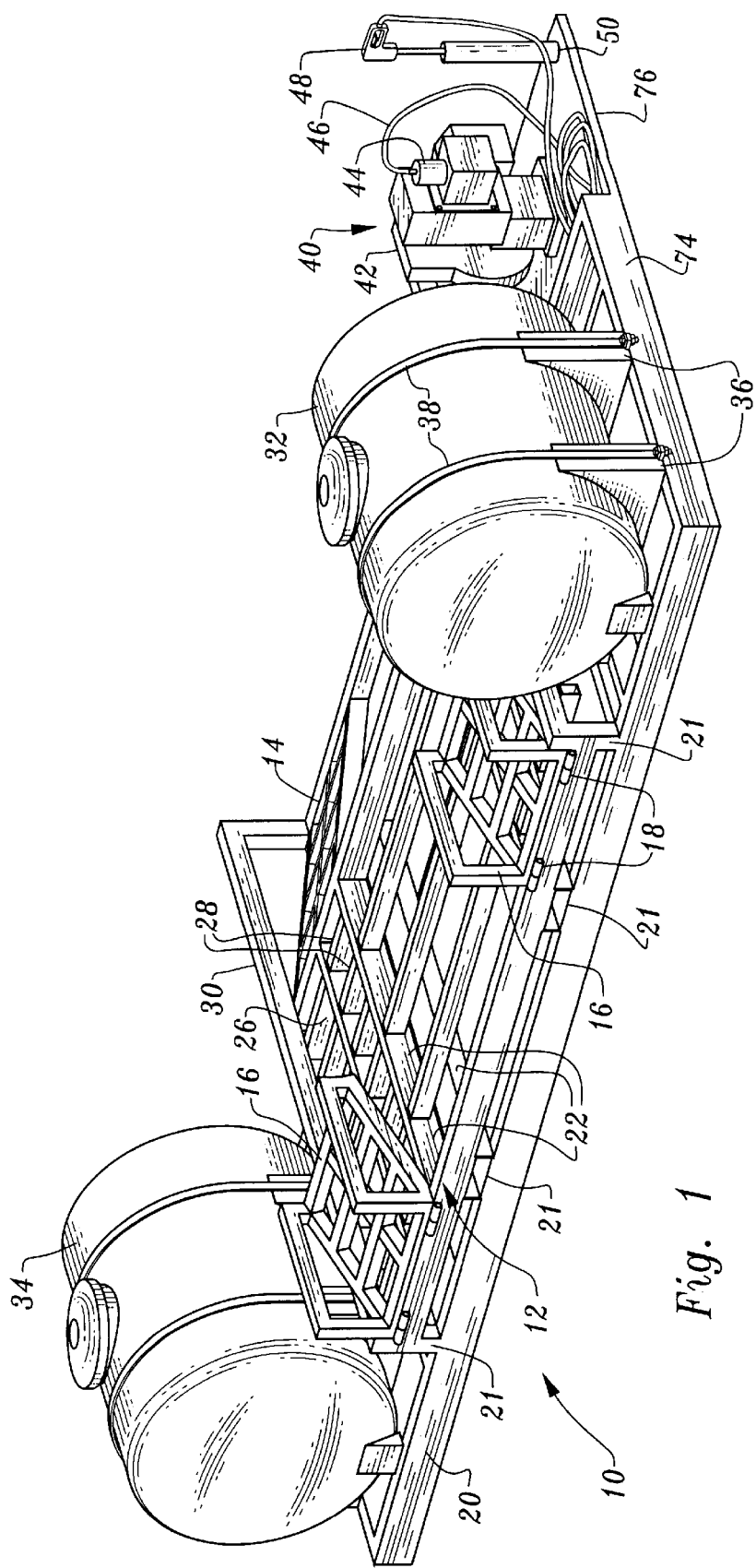
FIG. 1 is a perspective view of the present invention which illustrates the manner in which the base and wash platform are constructed and the orientation of the major components in relation to the base including the storage tanks and the pump and pump motor.

Referring now to the drawings, and more specifically to FIGS. 1, 3, 4, and 5, a preferred embodiment of the invention is shown. The vehicle was ramp 10 is primarily made up of a wash ramp base 20 and a wash platform 12 resting upon the base 20. These components of the present invention are built with a frame work which consists of a plurality of frame support rails 22 that run from the front to the back of the wash platform 12 and the wash ramp base 20. The frame support rails 22 are tied together by the use of the base cross members 24 which run perpendicularly to the frame support rails 20. This method of construction forms a lattice frame which provides the necessary degree of strength to the wash platform 12 and wash ramp base 20 while still being light enough to allow the entire invention to be easily moved between work sites and allow liquids to fall through the platform 12. While the lattice shown is preferred, any form of foraminous surface on the platform 12 can provide the function desired.

The platform 12 is located above the base 20 so that dirt and debris can fall off the vehicle 66 through the lattice of the rails 22 and members 24, 28. This spacing can be maintained by resting the platform 12 upon the base 20, but preferably is augmented somewhat by placing standoffs 21 between the platform 12 and the base 20.

The wash platform is equipped with a pair of wheel tracks 26 which are basically a portion of the wash platform 12 that have a greater concentration of frame support rails 22 and a plurality of track cross members 28 which are configured to form a lattice frame work that is denser than the rest of the wash platform 12. This denser lattice within the wheel tracks 26 provides more strength to help compensate for the added weight of the vehicle 66 (FIG. 2) as it passes over the wash platform 12 and also provide a smoother surface for the vehicle 66. Additionally, each of the wheel tracks 26 are equipped with a outer wheel rail 30 which run the length of the wheel track 26 and serve as lateral barriers to keep the vehicle 66 properly oriented on the wash platform during the wash procedure.

Access to the wash platform 12 is preferably gained on the rear side of the invention through the fixed platform ramps 14 which form an extension of the wheel tracks that extend diagonally downward from the upper surface of the wash platform 12 to the surface upon which the invention rests. Thus, the fixed platform ramps 14 provide a short incline which allows vehicles 66 to reach the level of the wash platform 12.

The opposite side of the wash platform 12 is equipped with a forwardly oriented pair of ramps 16 which allow a vehicle 66 to smoothly transition with the ground before or after the completion of the cleaning. These pivoting platform ramps 16 are attached through ramp hinges 18 used to attach the ramps 16 to the front upper edge of the wash platform 12 and allow the bodies of the pivoting platform ramps 16 to pivot around this point of attachment. When pivoted outward to their extended position, the pivoting platform ramps 16 come into contact with the ground and provide a route of vehicle 66 egress. Conversely, when the pivoting platform ramps 16 are rotated upward around the ramp hinges 18 to their retracted position, they are placed up and out of the way on the upper surface of the wash platform 12 which facilitates easy transportation of the present invention as it reduces the overall size of its exterior footprint.

Figure 2:
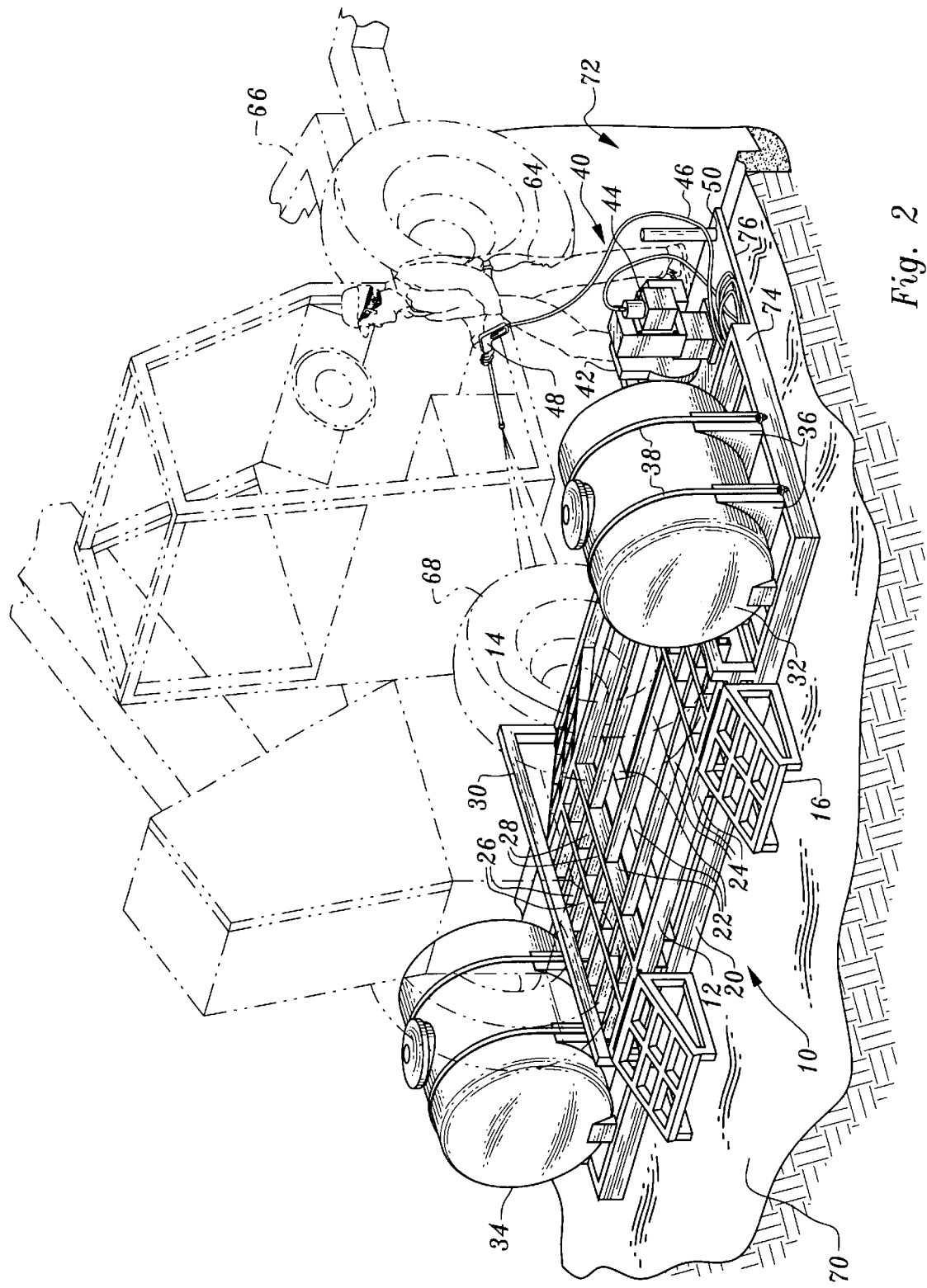
FIG. 2 is a perspective view of the present invention illustrating the manner in which a vehicle (shown in phantom) is positioned on the wash platform and the way that an operator employs the spray wand to direct the flow of high pressure water onto the specific components of the vehicle.
Figure 3:
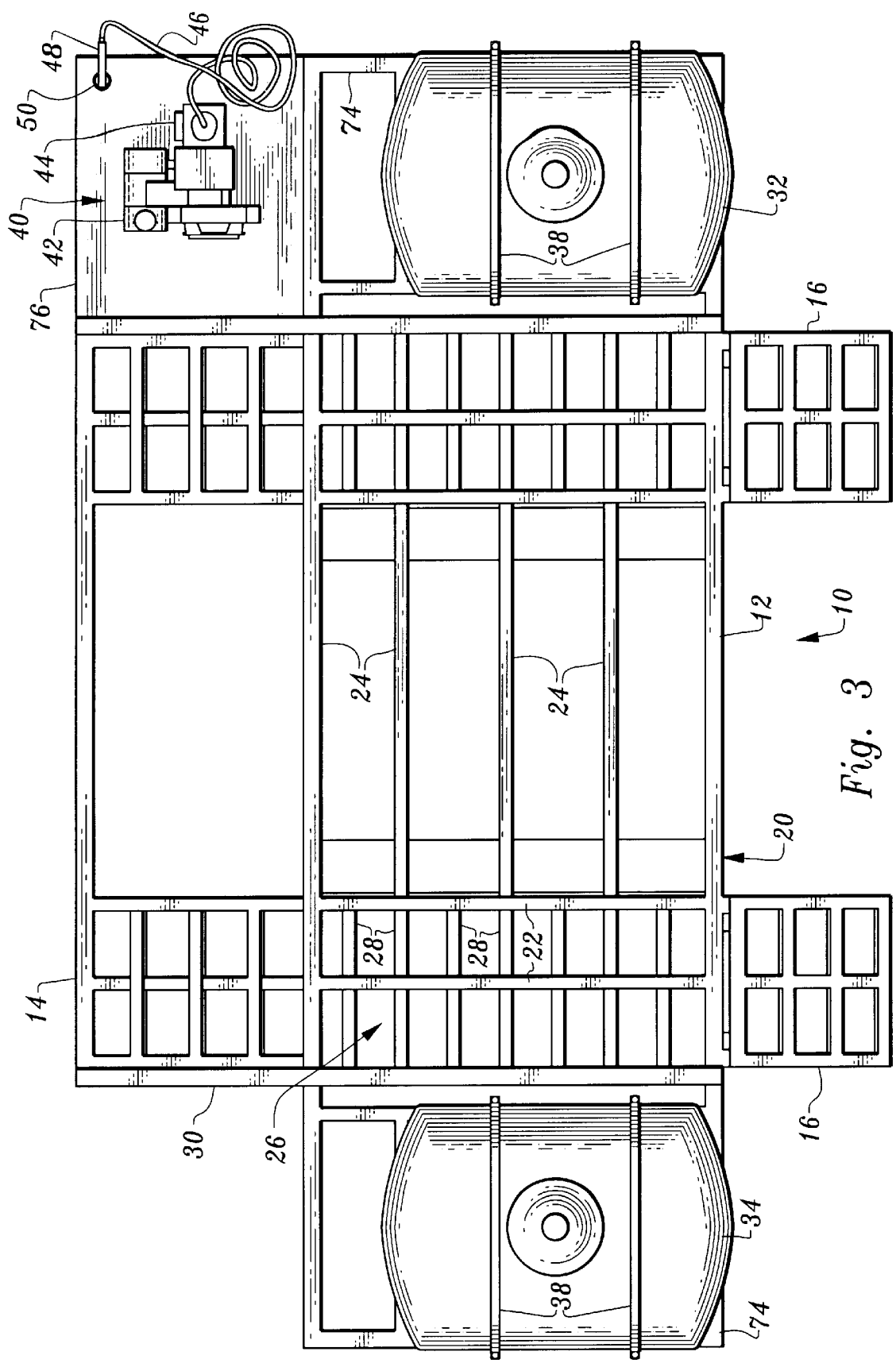
FIG. 3 is a top plan view of the present invention illustrating the lattice method of construction of the base and the wash platform and also further detailing the orientation of the storage tanks and the pump assembly in relation to the body of the invention.
Figure 4:
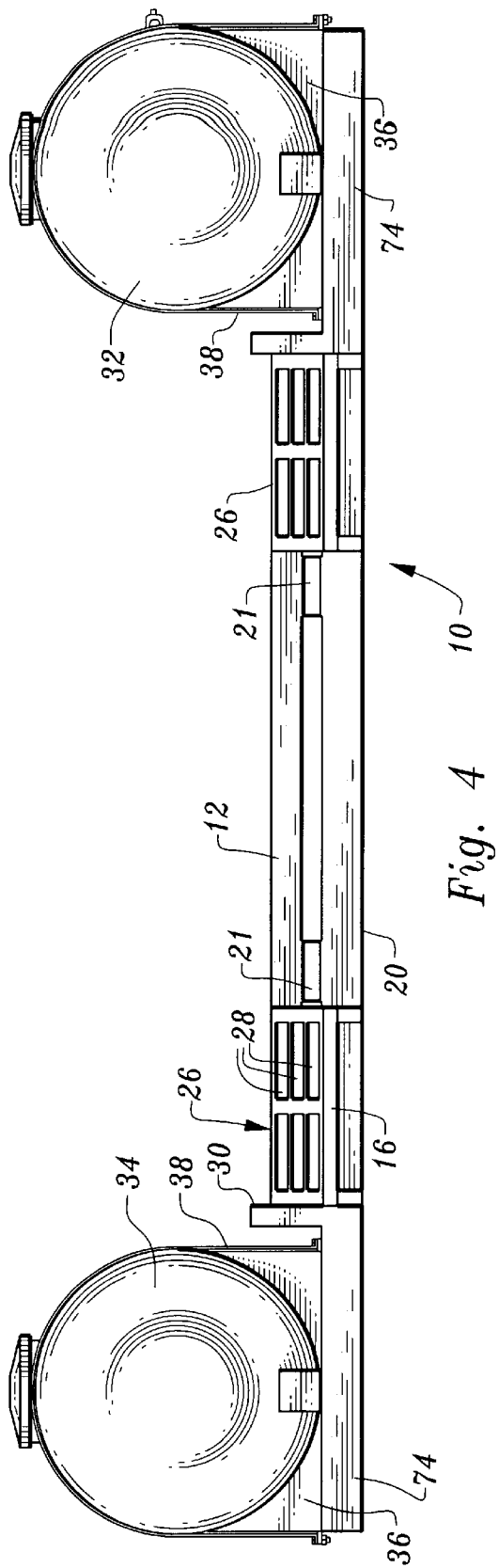
FIG. 4 is a front elevation view of the present invention detailing the configuration of the wash platform in relation to the base and the location of the storage tanks in relation to the wash platform.
Figure 5:
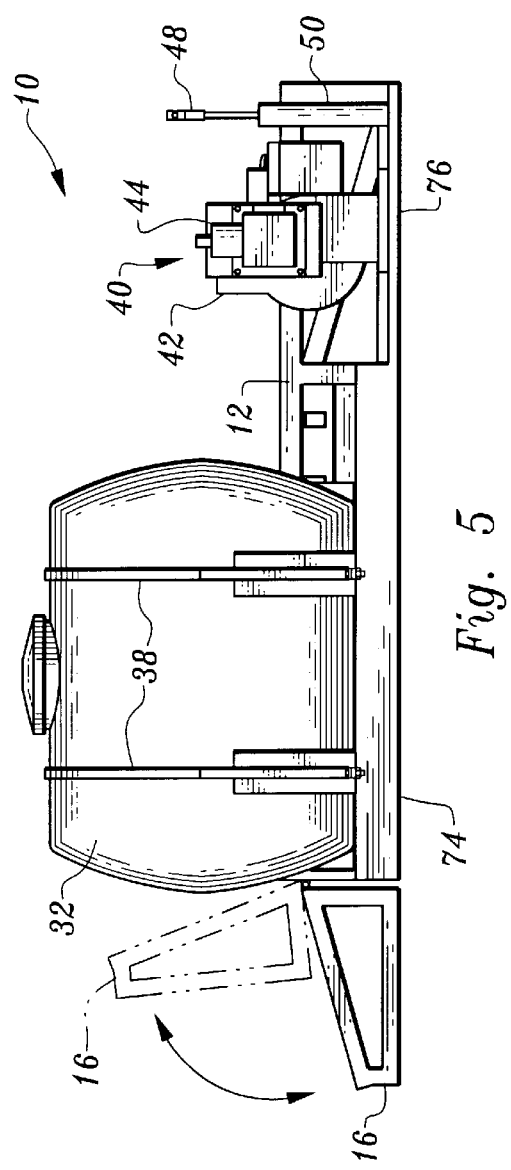
FIG. 5 is a side elevation view of the present invention illustrating the manner in which the pivoting platform ramps operate and the orientation of the pump assembly in relation to the other components of the invention.

While the pivoting ramps 16 and fixed ramps 14 are shown on opposite sides of the vehicle wash ramp 10, various configurations are possible as alternatives. For instance, the vehicle wash ramp 10 could be provided with fixed platform ramps 14 on both sides of the wash ramp 10 or could be provided with pivoting platform ramps 16 on both front and rear sides of the wash ramp 10. While the vehicle wash ramp 10 is shown in FIG. 2 with the pivoting platform ramps 16 resting upon the bare soil, the wash ramp 10 could be reversed so that the pivoting platform ramps 16 rest upon the pavement/hard surface 72. Also, the pivoting platform ramps 16 could be provided with a ramp hinge 18 that allows both rotation and some vertical translation, such as by mounting the hinges 18 to the pivoting platform ramp 16 within a vertical slot, such that the pivoting platform ramp 16 can float vertically down, such as onto the hard surface 72 of a road below a curb upon which remaining portions of vehicle wash ramp 10 are located. Also, an angle of slope and a length of the pivoting platform ramps 16 and/or the fixed platform ramps 14 can be varied to suit the needs of the site where the vehicle wash ramp 10 is to be utilized.

The outer and forward edges of the wash ramp base 20 are made up of the two tank platforms 74 which provide the points of attachment for the primary cleaning solution tank 32 and the secondary cleaning solution tank 34. With the tanks 32, 34 at ends of the wash ramp 10, the ramp 10 is well balanced for ease of handling. This mounting is accomplished by the use of tank retainers 36 which are generally a pair of upwardly oriented concavely shaped brackets that serve to cradle the bottom half of the cylindrically shaped primary and secondary cleaning solution tanks, 32 and 34. This configuration is then secured by the use of an equal number of tank U-bolt clamps 38 or straps which encircle the upper cylindrical half of the primary and secondary cleaning solution tanks, 32 and 34, and which are fixedly attached at the bottom surface of the tank retainers 36 which ensures that they will remain in the proper position on the wash ramp base 20 during both use and transportation of the invention.

The primary and secondary cleaning solution tanks, 32 and 34 provide a location on the body of the invention within which a variety of cleaning solutions can be stored for use in the cleaning operations. The cleaning solution is preferably water with optionally a cleanser, such as a biodegradable soap, included in one or both of the tanks 32, 34. The location and size of the primary and secondary cleaning solution tanks, 32 and 34, allows for the use of the invention without the need to be connected to an outside water source. This is a critical design feature of the present invention as it enhances its portability which increases its flexibility. To make full use of this flexibility, the user can either fill the primary and secondary cleaning solution tanks, 32 and 34, prior to positioning the invention at the work site or by tanking in the necessary water on a tanker truck and filling the primary and secondary cleaning solution tanks, 32 and 34, at the work site. Therefore, the use and design of these storage systems allows the present invention to be placed where needed without regard to the existence of an on site water source.

The wash ramp base 20 also contains a motor platform 76 which is preferably located at the rear corner of the wash ramp base 20 behind the primary cleaning solution tank 32. The motor platform 76 provides the point of attachment for the pump assembly 40 which is made up of the pump motor 42 and the fluid pump 44. The purpose of the pump assembly 40 is to draw and pressurize the water or other cleaning solution from the primary and secondary cleaning solution tanks 32, 34, and then to direct it through the high pressure hose 46 to the spray wand 48 which is used to project a stream of high pressure liquid cleaner to a specific and controlled location. When not in use, the spray wand 48 is stored in the wand holster 50 which is essentially an open vertically oriented tube into which the spray wand 48 is fitted and which is located at the outside rearward corner of the motor platform 76.

The rotational power necessary to run the pump assembly 40 is supplied by the pump motor 42 which is most commonly a small gasoline or diesel powered engine. However, it must also be noted that the rotational power could also be powered by an electric motor and battery combination or any other independent and compact power source. The pump motor 42 is then used to drive the fluid pump 44 which provides the water pressure to the invention as described above. Again, the use of a power source that can be operated independently of any outside support mechanism enhances the present invention's ability to be used at remote work sites. Typically, the motor 42 would be started first and run at high rpms until the pump 44 has fully charged a small outlet reservoir downstream from the pump 44 or merely the interior of the hose 46. Water pressure then exists to clean the vehicle with high pressure liquid. When pressure is high, the motor 42 would slow down, and when pressure begins to drop the motor 42 would speed up, such as by coupling the throttle of the motor 42 to a pressure sensor down stream from the pump 44.

The manner in which the present invention is used to clean the tires 68 and undercarriage of a vehicle 66 is most clearly illustrated in FIG. 2. FIG. 2 depicts the invention as it is most commonly deployed by straddling the border between the bare soil 70 of a work site or field and the hard surface 72 of a road or highway. With the invention properly positioned in this manner, a vehicle 66 can be driven up the pivoting platform ramps 16 and positioned at the center of the wash platform 12. Once this has been accomplished, the operator 64 can activate the pump motor 42 and fluid pump 44, remove the spray wand 48 from the wand holster 50 and direct the water stream towards the tires 68 and other potentially muddy parts of the vehicle 66. After the completion of the cleaning process, the operator 64 then simply drives the clean vehicle down the fixed platform ramps 14 off of the invention and onto the hard surface 72 of the road or highway.

Figure 6:
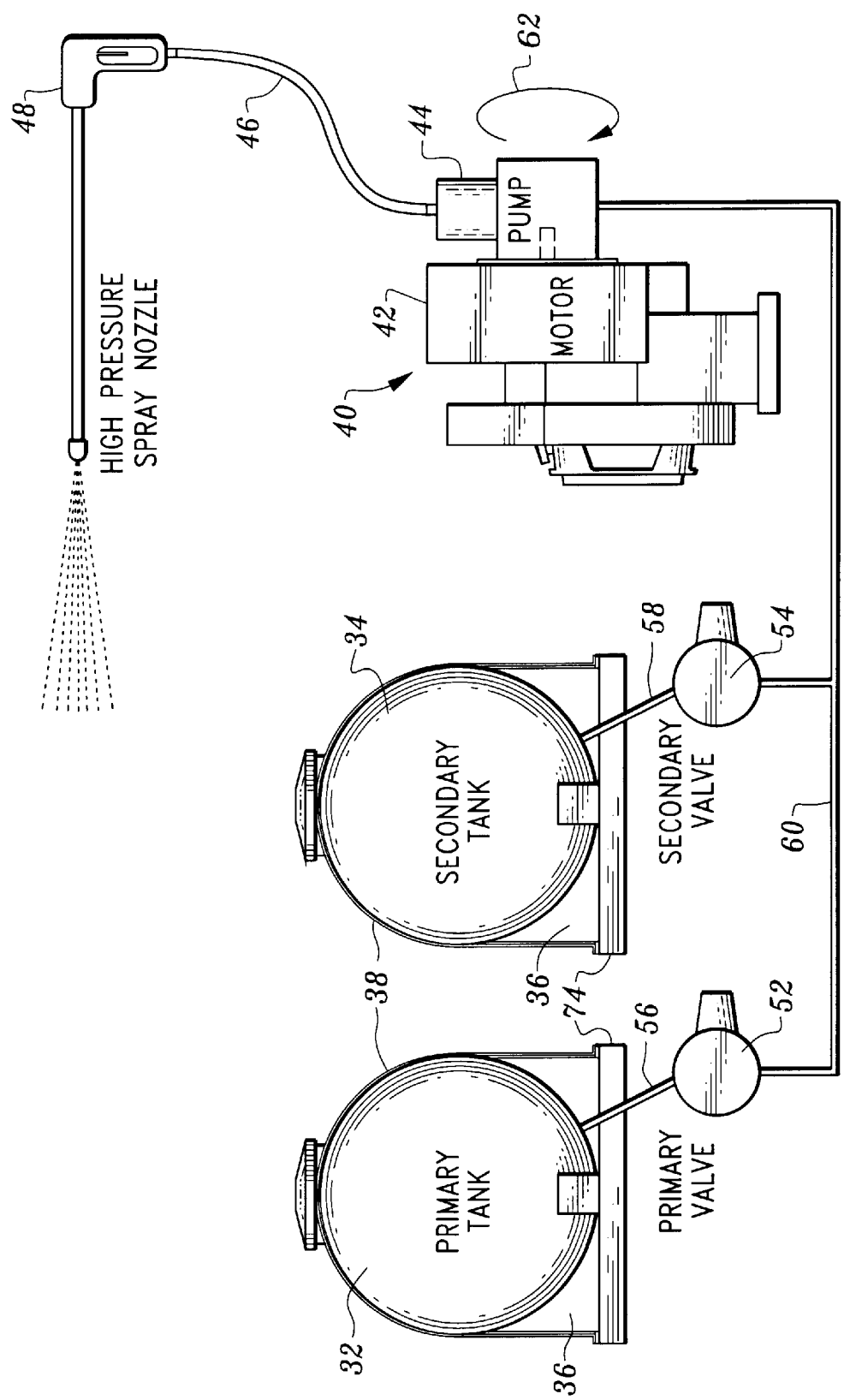
FIG. 6 is a schematic diagram of the present invention's major components which details the manner in which these components work together to form the high pressure water stream used to clean the vehicles.

The manner in which the pump assembly 40 works with the other components of the invention is further detailed in FIG. 6. The fluid pump 44 is preferably a centrifugal pump with a rotational direction 62 of the pump assembly 40 used to draw the water or other cleaning solution from the primary and secondary cleaning solution tanks, 32 and 34. The flow of water from the primary and secondary cleaning solution tanks, 32 and 34, is controlled by the primary control valve 52 and the secondary control valve 54 respectively. The primary and secondary control valves, 52 and 54, can either be manually controlled or completely automated and are typically configured to switch the flow of fluids from an empty tank to a full one or to exactly control the flow of different types of fluid from either of the cleaning solution tanks, 32 and 34 (i.e. first a water and cleanser in one tank 32, 34 and then water or a rinsing solution in the other tank 34, 32). If the tanks contain the same fluid, the control functions of the primary and secondary control valves, 52 and 54, are facilitated and automated by tying them into sensors located within the primary and secondary cleaning solution tanks, 32 and 34, which monitor the fluid levels contained therein.

The fluid from the primary cleaning solution tank 32 is directed to the primary control valve 52 through the primary feed line 56. Conversely, the fluid from the secondary cleaning solution tank 34 is directed to the secondary control valve 54 through the secondary feed line 58. The primary and secondary control valves, 52 and 54, are both jointly connected to the pump assembly 40 through the transport line 60. If desired, one tank 32, 34 can contain a concentrated cleanser and the valves can be simultaneously opened so that water in one tank 32, 34 mixes with cleanser from the tank 34, 32 when desired by the operator. The fluid is then pressurized within the pump 44 and directed through the high pressure hose 46 to the spray wand 48.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure and of the claims. When structures are identified as a means to perform a function, the identification is intended to include all structures which can perform the function specified.

What is claimed is:

1. A vehicle wash ramp comprising in combination:

a base configured to rest upon a surface;

a platform coupled to said base and positioned above said base, said platform having a width at least as wide as a vehicle to be washed by said wash ramp;

at least one liquid storage container attached to said vehicle wash ramp;

at least one outlet hose coupled to said liquid storage container, such that liquid within said liquid storage container can be directed against surfaces of a vehicle resting upon said platform;

wherein a liquid pump is provided between said at least one liquid storage container and said outlet hose, such that a pressure of liquid exiting said outlet hose is enhanced;

wherein at least two liquid storage containers are attached to said vehicle wash ramp;

wherein at least one valve is interposed between each of said at least two liquid storage containers and said outlet such that liquid flow between said at least two liquid storage containers and said outlet can be controlled; and wherein one of said at least two liquid storage containers is located on a first lateral side of said platform and a second one of said two liquid storage containers is located on a second lateral side of said platform, such that said platform is located between said at least two liquid storage containers.

2. A vehicle wash ramp comprising in combination:

a base configured to rest upon a surface;

a platform coupled to said base and positioned above said base, said platform having a width at least as wide as a vehicle to be washed by said wash ramp;

at least one liquid storage container attached to said vehicle wash ramp;

at least one outlet hose coupled to said liquid storage container, such that liquid within said liquid storage container can be directed against surfaces of a vehicle resting upon said platform;

wherein a liquid pump is provided between said at least one liquid storage container and said outlet hose, such that a pressure of liquid exiting said outlet hose is enhanced;

wherein at least two liquid storage containers are attached to said vehicle wash ramp;

wherein at least one valve is interposed between each of said at least two liquid storage containers and said outlet such that liquid flow between said at least two liquid storage containers and said outlet can be controlled;

wherein one of said at least two liquid storage containers is located on a first lateral side of said platform and a second one of said two liquid storage containers is located on a second lateral side of said platform, such that said platform is located between said at least two liquid storage containers; and wherein said liquid storage containers are in the form of rigid tanks attached to said base of said vehicle wash ramp.

3. A vehicle wash ramp comprising in combination:

a base configured to rest upon a surface;

a platform coupled to said base and positioned above said base, said platform having a width at least as wide as a vehicle to be washed by said wash ramp;

at least one liquid storage container attached to said vehicle wash ramp;

at least one outlet hose coupled to said liquid storage container, such that liquid within said liquid storage container can be directed against surfaces of a vehicle resting upon said platform;

wherein said platform includes a front side and a rear side, both said front side of said platform and said rear side of said platform open to vehicle passage onto and off of said platform;

wherein said platform includes at least one sloping ramp on at least one side of said platform, said sloping ramp sloping down from a level of said platform toward the surface upon which said base is positioned;

wherein a liquid pump is provided between said at least one liquid storage container and said outlet hose, such that a pressure of liquid exiting said outlet hose is enhanced;

wherein at least two liquid storage containers are attached to said vehicle wash ramp;

wherein at least one valve is interposed between each of said at least two liquid storage containers and said outlet such that liquid flow between said at least two liquid storage containers and said outlet can be controlled;

wherein one of said at least two liquid storage containers is located on a first lateral side of said platform and a second one of said two liquid storage containers is located on a second lateral side of said platform, such that said platform is located between said at least two liquid storage containers;

wherein said liquid storage containers are in the form of rigid tanks attached to said base of said vehicle wash ramp; and wherein said platform is foraminous.

* * * * *